United States Patent [19]

Johnson

[11] Patent Number: 5,052,149
[45] Date of Patent: Oct. 1, 1991

[54] PORTABLE APPARATUS FOR CAPTURING OVERFLOW FROM HANGING PLANTS

[75] Inventor: William J. Johnson, 1445 Sedalia Dr., Flower Mound, Tex. 75028

[73] Assignee: William J. Johnson, Flower Mound, Tex.

[21] Appl. No.: 510,454

[22] Filed: Apr. 17, 1990

[51] Int. Cl.⁵ .............................................. A47G 7/02
[52] U.S. Cl. ........................................ 47/67; 222/181
[58] Field of Search .................. 222/181 X, 185, 460, 222/527; 47/67; 141/340, 337

[56] References Cited

U.S. PATENT DOCUMENTS

| | | | |
|---|---|---|---|
| 1,095,504 | 5/1914 | Jannoch | 47/67 |
| 3,854,242 | 12/1974 | Gladstein | 47/67 X |
| 3,865,159 | 2/1975 | Mayfield | 141/340 X |
| 4,109,415 | 8/1978 | Hall | 47/67 |
| 4,229,904 | 10/1980 | Burton | 47/67 X |
| 4,614,056 | 9/1986 | Farkas | 47/67 |
| 4,633,899 | 1/1987 | Lord | 141/337 X |

Primary Examiner—David A. Scherbel
Assistant Examiner—Linda J. Watson
Attorney, Agent, or Firm—W. Kirk McCord

[57] ABSTRACT

An apparatus is provided for capturing overflow from hanging plant containers, which is comprised of a funnel member for being positioned below the plant container and a cup member centrally disposed in the funnel member. The cup member has a plurality of recesses in a bottom portion thereof for channeling matter received by the funnel member through a bottom opening in the funnel member. A flexible tube fits over the bottom opening to carry the material to a sink or container. A plurality of cords are attached to the funnel member for suspending the apparatus from the hanging plant container. A decorative article, such as a tassel, hanging below the plant is received within the cup member, to protect the article from the plant overflow. The apparatus is easily moved from plant to plant and allows a user to water hanging plants without worrying about dirty water overflow.

22 Claims, 2 Drawing Sheets

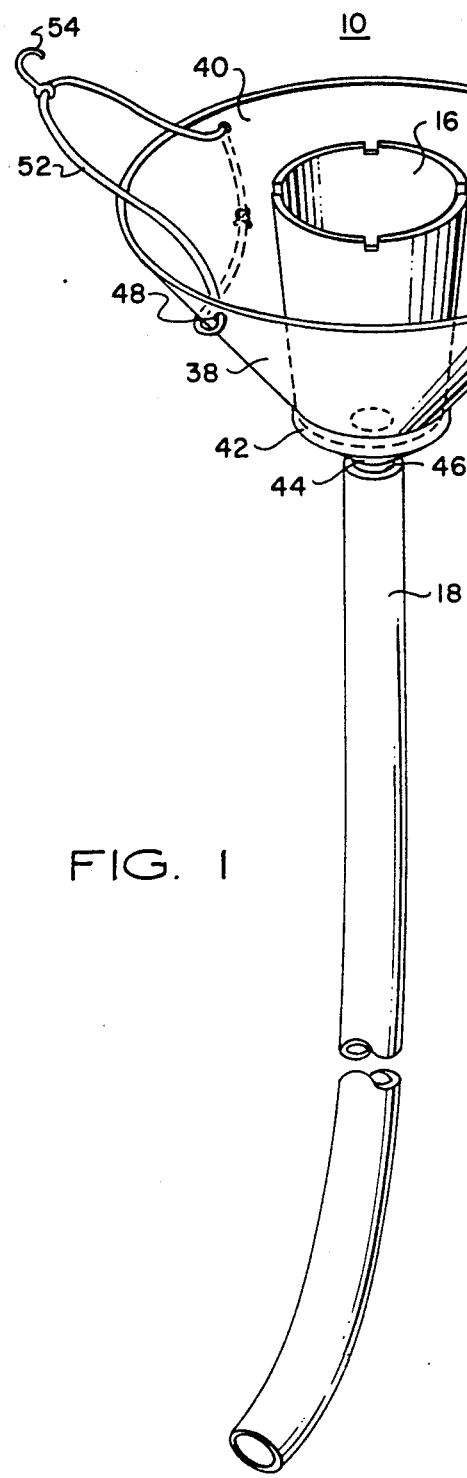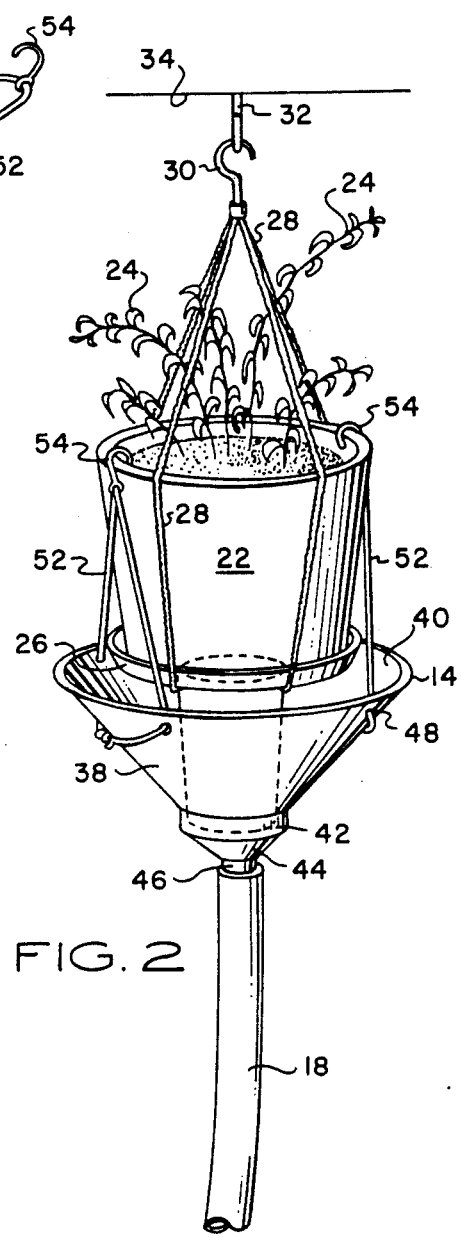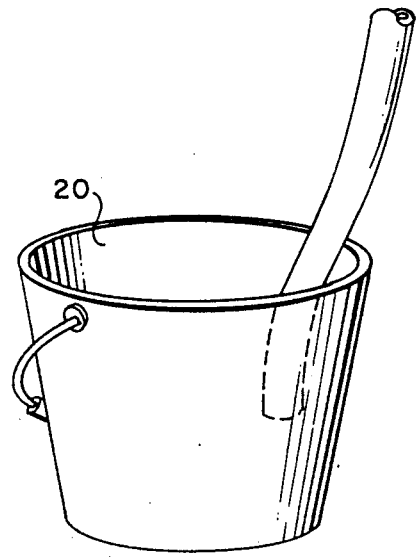
FIG. 1
FIG. 2

PORTABLE APPARATUS FOR CAPTURING OVERFLOW FROM HANGING PLANTS

FIELD OF INVENTION

This invention relates generally to accessories for hanging plants and in particular to an apparatus which is attachable to a hanging plant for capturing water overflow therefrom.

BACKGROUND OF THE INVENTION

Many types of plant life will thrive indoors without access to direct sunlight. Indoor plants are frequently used to beautify the interior of homes and office buildings and are popular with many gardeners and other individuals who may want to cultivate plants without having to go outdoors. Indoor plants typically grow in a pot or other suitable container filled with the proper soil to encourage plant growth. Many such plants are hung from walls and ceilings by cords or the like and are usually referred to as "hanging plants." Of course, hanging plants are found outdoors as well as indoors.

One problem associated with most hanging plants is the difficulty in watering the plants without removing them from their hanging positions. Optimum plant health is achieved by thorough watering at regular intervals, rather than more frequent, but spotty watering. If the hanging plant is not removed from its hanging position, thorough watering of the plant may result in dirty water overflow from the plant container onto objects below the plant, including a decorative tassel suspended below the plant container. Overflow often occurs because it is difficult to estimate the amount of water that the plant is receiving, especially when one must reach up to apply water to the plant. The alternative is to remove the plant from its hanging position to water it, but this is inconvenient.

DESCRIPTION OF THE PRIOR ART

Various types of devices are known in the art to facilitate plant irrigation. Examples of such prior art irrigation devices are shown in U.S. Pat. Nos. 165,000; 603,492; 1,154,627; 1,647,210; 3,949,542; 4,070,794; 4,170,089; 4,198,784; and 4,656,969.

Although the prior art includes many types of devices for irrigating plants, there is no suitable apparatus for capturing water overflow from commonly used hanging plant containers when the plants are watered without removing them from their hanging positions. Furthermore, there has heretofore been no suitable device for capturing overflow from hanging plants, which can be quickly and conveniently mounted on and removed from the hanging plant, so that the device can be conveniently moved from plant to plant.

OBJECT OF THE INVENTION

It is therefore the principal object of the present invention to provide an improved apparatus for capturing water overflow from hanging plants.

Another object of the invention is to provide a portable apparatus for capturing water overflow from hanging plants, which can be conveniently attached to and removed from a hanging plant, thereby facilitating the watering of a multiplicity of hanging plants.

Yet another object of the invention is to provide an apparatus to facilitate thorough watering of hanging plants.

A further object of the invention is to provide an apparatus to facilitate thorough watering of hanging plants without removing the plants from their hanging positions.

SUMMARY OF THE INVENTION

These and other objects are accomplished in accordance with the present invention wherein an apparatus is provided for capturing overflow from a hanging plant container or the like. The apparatus includes a first member having an open mouth for being positioned below the container to receive overflow of matter therefrom and a bottom opening for allowing the matter to escape from the first member, and a second member for being removably disposed at least partially within the first member.

In one aspect of the invention, a portion of the second member protrudes from the open mouth of the first member for engaging the container to maintain the first member and the container in spaced-apart relation. In one embodiment, conduit means, such as a flexible hose, is provided for being coupled to the first member, adjacent to the bottom opening, for conducting the matter to a disposal site.

In another aspect of the invention, the second member has an open top for receiving an article, such as a hanging plant tassel, therein to protect the article from overflow when the plant is being watered. In one embodiment, the second member has at least one notch in a top edge thereof for receiving a cord or the like disposed on a bottom part of the hanging plant container, to allow the top edge of the second member to contact the bottom part of the container.

In yet another aspect of the invention, attachment means is provided for coupling the first member to the container. In one embodiment, the attachment means includes a plurality of cords having respective attachment members disposed thereon for engaging the container to suspend the first member below the container. The cords are preferably made of an elastic material.

In the preferred embodiment, the second member is substantially cylindrical and has a plurality of recesses positioned at substantially equal angular intervals around the bottom portion of the second member for channeling the overflow through the bottom opening in the first member. The first member is preferably comprised of a first conical portion tapering inwardly from the open mouth thereof, a first cylindrical portion extending from the first conical portion, a second conical portion tapering inwardly from the first cylindrical portion, and a second cylindrical portion extending from the second conical portion. A flexible tube having an inside diameter which is substantially the same as an outside diameter of the second cylindrical portion is provided to conduct the matter flowing through the bottom opening of the first member to the disposal site. The tube is sized so that it will fit tightly over the second cylindrical portion of the first member to prevent spillage of the matter flowing through the bottom opening.

BRIEF DESCRIPTION OF THE DRAWINGS

Other objects and advantages of the invention will be apparent from the detailed description and claims when read in conjunction with the accompanying drawings, wherein:

3

Figure 3:
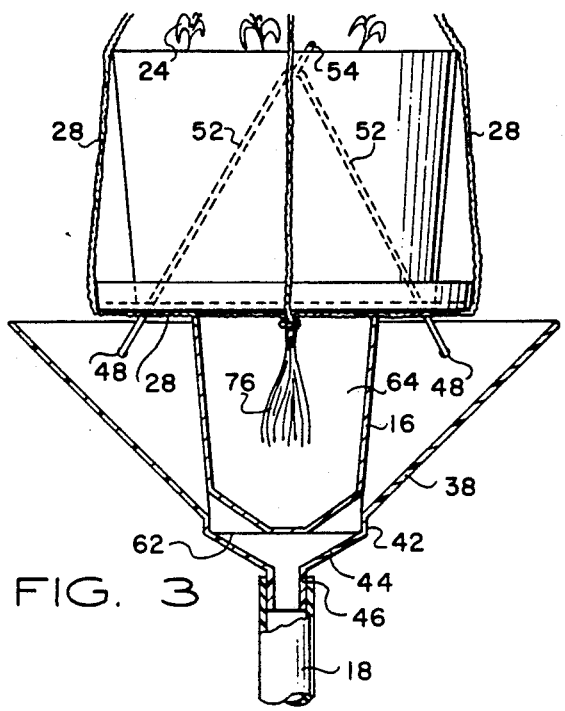
Figure 4:
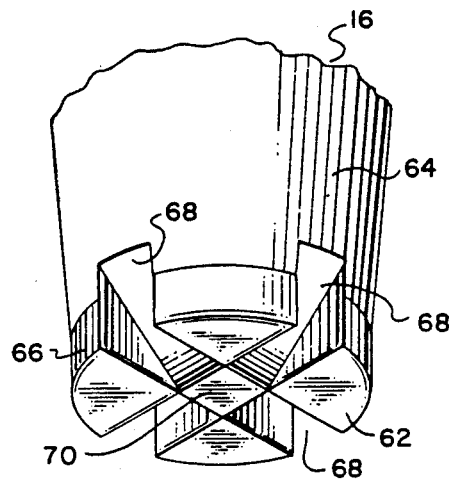
Figure 5:
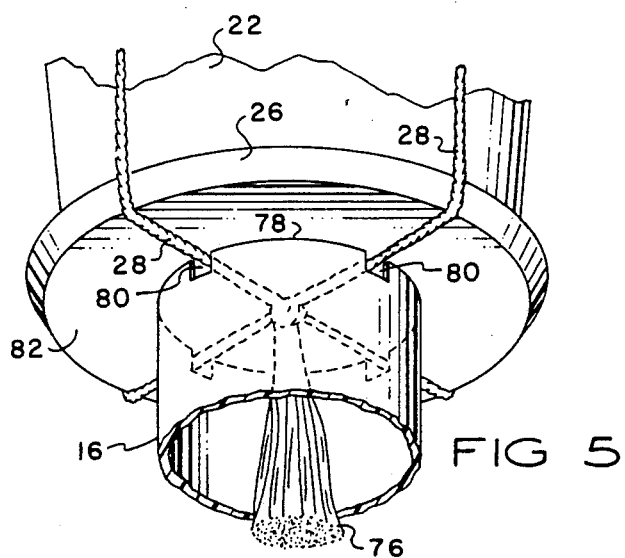
Figure 6:
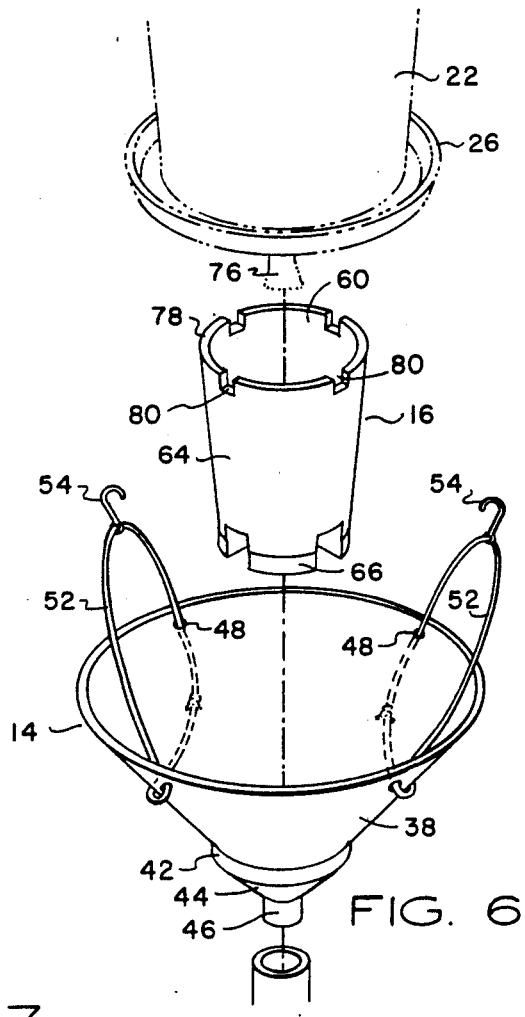

FIG. 1 is a perspective view of an apparatus for capturing overflow from a hanging plant container or the like, according to the present invention;

FIG. 2 is a perspective view of the apparatus of FIG. 1 mounted on a hanging plant container;

FIG. 3 is a sectional view of the apparatus mounted on the hanging plant container;

FIG. 4 is a bottom perspective view of a portion of the apparatus of FIG. 1;

FIG. 5 is a perspective view, showing the engagement between a hanging plant container and an upwardly extending portion of the apparatus;

FIG. 6 is an exploded view of the apparatus of FIG. 1; and

Figure 7:
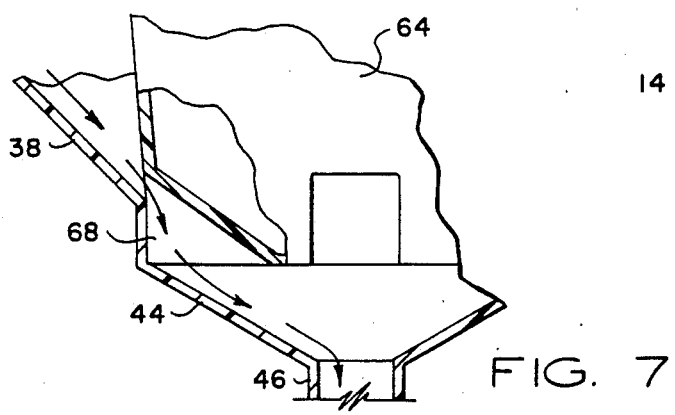

FIG. 7 is a sectional view, illustrating the path of the overflow material captured by the apparatus of FIG. 1.

DETAILED DESCRIPTION OF THE PREFERRED EMBODIMENT

In the description which follows, like parts are marked throughout the specification and drawings, respectively. The drawings are not necessarily to scale and in some instances proportions have been exaggerated in order to more clearly depict certain features of the invention.

Referring to FIGS. 1 and 2, an apparatus 10 is provided for capturing overflow from a hanging plant. Apparatus 10 includes a funnel member 14, a cup member 16, which is centrally disposed in funnel member 14, and a flexible tube 18, which is coupled to a bottom part of funnel member 14 for conducting solid and liquid matter received by funnel member 14 to a disposal site, such as a bucket 20.

The hanging plant typically includes a container 22 in which vegetation 24 is disposed and a base member 26 having upwardly extending walls for trapping at least some of the drainage from the bottom of container 22. A plurality of ropes 28 extend beneath base member 26 and upwardly around container 22 for supporting the hanging plant in a suspended position. Ropes 28 converge above vegetation 24 and are attached to a mounting member 30, which engages a hook 32 attached to a support surface 34, such as a ceiling or wall. A decorative tassel 76 (see FIGS. 3, 5 and 6) may be suspended from ropes 28 beneath base member 26.

Funnel member 14 is preferably comprised of a first conical portion 38 tapering inwardly from open mouth 40 of funnel member 14; a first cylindrical portion 42 extending downwardly from first conical portion 38; a second conical portion 44 tapering inwardly from first cylindrical portion 42; and a second cylindrical portion 46 extending downwardly from second conical portion 44, all of which are integrally formed to define funnel member 14. Second cylindrical portion 46 has a bottom opening communicating with open mouth 40, to allow matter introduced into funnel member 14 through open mouth 40 to escape by gravity flow from funnel member 14.

Funnel member 14 has a plurality of apertures 48 adjacent to a top edge thereof for receiving elastic cords 52. The free ends of each cord 52 are passed through respective apertures 48 and secured together on the outside of funnel member 14 to define a loop, a portion of which is inside of funnel member 14. Alternatively, the free ends of each cord 52 may be secured separately to funnel member 14 after the free ends have been passed through respective apertures 48. An attachment member, such as a hook 54, is centrally disposed on the corresponding portion of each cord 52 inside funnel member 14 for mounting apparatus 10 in a suspended position below the hanging plant, as best seen in FIG. 2. This configuration facilitates the attachment of the apparatus 10 to the hanging plant because a user can conveniently grip one cord 52 in each hand to attach the corresponding hook 54 to the container 22. Elastic cords 52 exert a pulling force to maintain apparatus 10 up against the hanging plant. A mechanism (not shown) may be included to adjust the respective lengths of elastic cords 52. In an alternate embodiment (not shown), spring-loaded clamps, such as those used in conventional clothes pin hangers, can be disposed on the elastic cords 52, to attach apparatus 10 to ropes 28 or directly to container 22. The clamps may include a hook portion so that cords 52 can be either hooked or clamped to container 22.

When water is applied to vegetation 24 from a water source, such as a hose or watering can, water leaking from container 22 often spills over the upwardly extending walls of base member 26. Open mouth 40 of funnel member 14 is wider than the diameter of base member 26 to capture substantially all of the overflow therefrom. The water overflow will usually contain dirt and other particulate matter from the soil in which vegetation 24 is disposed.

Referring to FIGS. 3-7, cup member 16 has a substantially cylindrical shape with an open top 60, a closed bottom 62 and a cylindrical wall 64 extending therebetween. A lower portion 66 of wall 64, which extends approximately ¾ inch upwardly from bottom surface 62, is substantially vertical for engaging an inner wall of first cylindrical portion 42 of funnel member 14, as best seen in FIGS. 3 and 7. The inside diameter of first cylindrical portion 42 is substantially the same as the outside diameter of lower portion 66 so that cup member 16 can be securely seated within funnel member 14. Cup member 16 is disposed within funnel member 14 so as to be readily removable therefrom as desired.

Referring specifically to FIGS. 4 and 7, cup member 6 has a plurality of recesses 68, disposed at substantially equal angular intervals around bottom surface 62. Each recess 68 extends at least partially across bottom 62 and terminates at a central portion 70 of bottom 62. Each recess 68 also extends partially upward from bottom surface 62 along wall 64 (e.g., approximately 1¼ inch). The upward extension of each recess 68 must substantially exceed the vertical height of lower portion 66 of wall 64, so that material captured by funnel member 14 can flow through the bottom opening of funnel member 14.

As best seen in FIG. 7, recesses 68 provide respective channels for allowing matter introduced into funnel member 14 to flow between the inner wall of conical portion 38 of funnel member 14 and wall 64 of cup member 16, as indicated by the arrows in FIG. 7. The overflow material passes beneath cup member 16 and into a passageway communicating with the bottom opening of funnel member 14. Flexible tube 18 has an inner diameter which is substantially the same as the outer diameter of second cylindrical portion 46, so that flexible tube 18 fits snugly over second cylindrical portion 46 to carry matter flowing through the bottom opening of funnel member 14 to a disposal site.

When the overflow has substantially stopped, container 22 and base member 26 should be tilted slightly to remove the last vestiges of excess water from base member 26. Water droplets on the outside of container 22 and base member 26 may be wiped off before apparatus 10 is removed from the hanging plant, to protect floors and other objects beneath the plant.

The primary purpose of cup member 16 is to protect tassel 76 while vegetation 24 is being watered. A top edge of cup member 16 may have a plurality of notches 80 for receiving the portions of ropes 28 extending across a bottom surface 82 of base member 26, as best seen in FIG. 5. When ropes 28 are received within corresponding notches 80, the top edge of cup member 16 can be placed directly into contact with bottom surface 82 of base member 26 so that the overflow from hanging plant 12 does not penetrate cup member 16. When cup member 16 is so positioned, tassel 76 can be housed therein, so that tassel 76 is substantially protected from plant overflow. The top edge of cup member 16 need not be placed in direct contact with bottom surface 82 of base member 26, but only in close proximity thereto, such that notches 80 are not necessary.

In the preferred embodiment, cup member 16 is comprised of a lightweight plastic material having a thickness of approximately 1/16 inch. To facilitate a thermoforming manufacturing process, cup member 16 may have a slight inward taper from the top edge downwardly, provided that lower portion 66 (e.g., approximately ¾ inch from bottom 62) of cup member 16 is substantially vertical in order to securely seat cup member 16 within first cylindrical portion 42 of funnel member 14. For example, cup member 16 may be approximately 5½ inches high with a width of approximately 5¼ inches at its open mouth, tapering downwardly to a width of approximately four inches at bottom 62. As best seen in FIG. 3, the formation of recesses 68 on respective outer surfaces of bottom 62 and wall 64 forms respective complementary ribs on respective inner surfaces of bottom 62 and wall 64.

Funnel member 14 is also preferably comprised of a lightweight plastic material having a thickness of approximately 1/16 inch. Each aperture 48 has a diameter of approximately 1/16 to ¼ inch and is positioned so that the centerline of the corresponding aperture 48 is approximately ⅜ inch below the top edge of funnel member 14. First conical portion 38 tapers downwardly from a diameter of approximately 14½ inches at the open mouth 40 thereof to an outer diameter of approximately 4⅛ inches at first cylindrical portion 42. The height of first conical portion 38 along a vertical axis is approximately 4½ inches. The respective heights of first cylindrical portion 42, second conical portion 44 and second cylindrical portion 46 along the same vertical axis are approximately ¾ inch, one inch and one inch. The outer diameter of second cylindrical portion 46 is also approximately 1 inch. The cumulative heights of first conical portion 38 and first cylindrical portion 42 are approximately 5¼ inches, which is slightly less than the height of cup member 16, so that top edge 78 of cup member 16 extends slightly above (e.g. ¼ inch) the top edge of funnel member 14, so that the top edge of cup member 16 will engage the bottom part of base member 26 to maintain funnel member 14 and base member 26 in spaced-apart relation, thereby facilitating the capture of overflow from container 22 by funnel member 14.

In an alternate embodiment funnel member 14 can be replaced with a flexible bag member (not shown), which is collapsible to facilitate storage thereof. In yet another embodiment, funnel member 14 and cup member 16 may each have a plurality of ribs to enhance the structural integrity thereof and to reduce the amount of material required for manufacturing. The apparatus according to the present invention may be configured in various sizes and may be customized for specific types and sizes of hanging plant containers.

One skilled in the art will appreciate that the apparatus described above is well-suited for capturing overflow of solid and liquid matter from hanging plants so that the plant does not have to be removed from its hanging position in order to be thoroughly watered. The apparatus is easily attachable to and removable from a hanging plant, so that the apparatus can be moved from plant to plant. Decorative articles, such as tassels, which are frequently suspended below hanging plants, are also protected from overflow.

Various embodiments of the invention have now been described in detail. Since it is obvious that many changes in and additions to the above-described preferred embodiment may be made without departing from the nature, spirit and scope of the invention, the invention is not to be limited to said details, except as set forth in the appended claims.

What is claimed is:

1. Apparatus for capturing overflow from a hanging plant container or the like, said apparatus comprising:
   a first member having an open mouth for being positioned below said container to receive overflow of matter therefrom and a bottom opening for allowing said matter to escape from said first member; and
   a second member for being disposed at least partially within said first member, such that a portion of said second member protrudes from the open mouth of the first member for engaging a bottom part of said container to maintain said first member and said container in spaced-apart relation.

2. Apparatus of claim 1 wherein said second member has a plurality of recesses in a bottom portion thereof for channeling said matter through said bottom opening.

3. Apparatus of claim 2 wherein said second member has an open top, a closed bottom and a wall extending therebetween, each of said recesses extending at least partially into said bottom and into a portion of said wall adjacent to said bottom.

4. Apparatus of claim 2 wherein said second member is substantially cylindrical and said first member includes a conical portion tapering inwardly from said open mouth and a cylindrical portion depending from said conical portion, said cylindrical portion having an inside diameter which is substantially the same as an outside diameter of a bottom portion of said second member for retaining the bottom portion of said second member in seating engagement within said cylindrical portion.

5. Apparatus of claim 4 wherein said second member is selectively removable from seating engagement within the first member.

6. Apparatus of claim 1 further including conduit means for being coupled to said first member adjacent to said bottom opening for routing matter passing through said bottom opening to a disposal site.

7. Apparatus of claim 1 further including attachment means for coupling said apparatus to the container in a suspended position below the container.

8. Apparatus of claim 7 wherein said attachment means includes a plurality of cords coupled to the first member, each of the cords having an attachment member disposed thereon for removably attaching the apparatus to the container.

9. Apparatus of claim 1 wherein said container includes an article suspended below the container, said second member having an open top for receiving said article within said second member, to protect said article while the plant is being watered.

10. Apparatus of claim 9 wherein said container has a plurality of cords on a bottom part thereof for suspending the article and supporting the container, said second member having a plurality of notches in a top edge thereof for receiving said cords to allow the top edge of said second member to contact the bottom part of said container.

11. Apparatus for capturing overflow from a hanging plant container or the like, said container having an article suspended therefrom, said apparatus comprising:
   a first member for being positioned below said container, said first member having a receptacle and an open mouth communicating therewith to receive overflow of matter from said container and a bottom opening for allowing said matter to escape from said first member; and
   a second member disposable at least partially within said first member and having an open top for receiving said article therein.

12. Apparatus of claim 11 further including attachment means for coupling said apparatus to the container in a suspended position below the container.

13. Apparatus of claim 12 wherein said attachment means includes a plurality of cords coupled tot he first member, each of the cords having an attachment member disposed thereon for removably attaching the apparatus to the container.

14. Apparatus of claim 11 wherein said container has a plurality of cords on a bottom part thereof for suspending the article and supporting the container, said second member having a plurality of notches in a top edge thereof for receiving said cords to allow the top edge of said second member to contact the bottom part of said container.

15. Apparatus of claim 11 further including conduit means for being coupled to said first member adjacent to said bottom opening for routing matter passing through said bottom opening to a disposal site.

16. Apparatus or capturing overflow from a hanging plant container or the like, said apparatus comprising:
   a funnel-shaped member having an open mouth for being positioned below the container to receive overflow of matter therefrom and a bottom opening for allowing said matter to escape from said funnel-shaped member;
   attachment means coupled to said funnel-shaped member for attaching the apparatus to the container in a suspended position below the container, said attachment means including first and second cords attached to said funnel-shaped member to define respective first and second loops, respective portions of said loops being within the funnel-shaped member and having respective attachment members centrally disposed thereon for removably attaching the apparatus to the container;
   a cup-shaped member for being disposed at least partially within the funnel-shaped member, such that a portion of said cup-shaped member protrudes from the open mouth of said funnel-shaped member for engaging said container to maintain the funnel-shaped member and the container in spaced apart relation; and
   conduit means coupled to said funnel-shaped member adjacent to said bottom opening for routing matter passed through said bottom opening to a disposal site.

17. Apparatus of claim 16 wherein said cup-shaped member has a plurality of recesses in a bottom portion thereof for channeling said matter through said bottom opening.

18. Apparatus for covering a decorative article or the like suspended below a hanging plant container, said apparatus comprising:
   a receptacle having an open top for receiving said decorative article or the like; and
   means for coupling said receptacle to the container, such that a top edge of said receptacle engages a bottom part of said container for substantially covering said decorative article or the like.

19. Apparatus of claim 18 wherein said coupling means includes a resilient member for holding the top edge of the receptacle in pressure contact with the bottom part of the container.

20. Apparatus of claim 18 wherein said container has a plurality of cords on the bottom part thereof for suspending the decorative article and supporting the container, said receptacle having a plurality of notches in the top edge thereof for receiving said cords to allow the top edge of said receptacle to contact the bottom part of the container.

21. Apparatus of claim 18 further including capture means having an open mouth for being positioned below said container to receive overflow of matter therefrom and a bottom opening for allowing said matter to escape from said capture means, said receptacle for being disposed at least partially within said capture means such that the top edge of the receptacle protrudes from the open mouth of the capture means for engaging the bottom part of the container to maintain the capture means and container in spaced-apart relation.

22. Apparatus of claim 21 further including conduit means for being coupled to said capture means adjacent to said bottom opening for routing matter passing through said bottom opening to a disposal site.

* * * * *